United States Patent [19]

Vincent, Jr. et al.

[11] 3,917,748

[45] Nov. 4, 1975

[54] PROCESS FOR MANUFACTURE OF RUBBER-MODIFIED COPOLYMERS OF AN OLEFINIC NITRILE AND A VINYL AROMATIC MONOMER

[75] Inventors: Bennett Frank Vincent, Jr., Chesterland; James L. O'Kane, Northfield, both of Ohio

[73] Assignee: The Standard Oil Company, Cleveland, Ohio

[22] Filed: May 31, 1973

[21] Appl. No.: 365,591

[52] U.S. Cl. .................. 260/880 R; 260/29.6 AN; 260/29.6 RB; 260/29.7 UA; 260/879; 260/881; 260/883; 426/118
[51] Int. Cl.[2] ................ C08L 9/00; C08L 47/00
[58] Field of Search ................ 260/879, 880 R

[56] References Cited
UNITED STATES PATENTS

| | | | |
|---|---|---|---|
| 3,451,538 | 6/1969 | Tremintozzi | 260/880 |
| 3,683,052 | 8/1972 | Coffey et al. | 260/880 |
| 3,742,092 | 6/1973 | Duke et al. | 260/879 |
| 3,763,278 | 10/1973 | Griffith | 260/880 |

OTHER PUBLICATIONS

Chemistry of Acrylonitrile – 2nd Edition, 1959, pp. 32–36.

*Primary Examiner*—Joseph L. Schofer
*Assistant Examiner*—Herbert J. Lilling
*Attorney, Agent, or Firm*—John F. Jones; Sherman J. Kemmer; Evelyn R. Kosman

[57] ABSTRACT

Impact resistant polymers having low permeability to gases and vapors which are useful materials for packaging of perishables are prepared by continuously adding the olefinic nitrile monomer and a vinyl aromatic monomer to a polymerization medium containing a latex of a rubber which is a polymer of a conjugated diene monomer, a vinyl aromatic monomer and an olefinic nitrile monomer.

6 Claims, 1 Drawing Figure

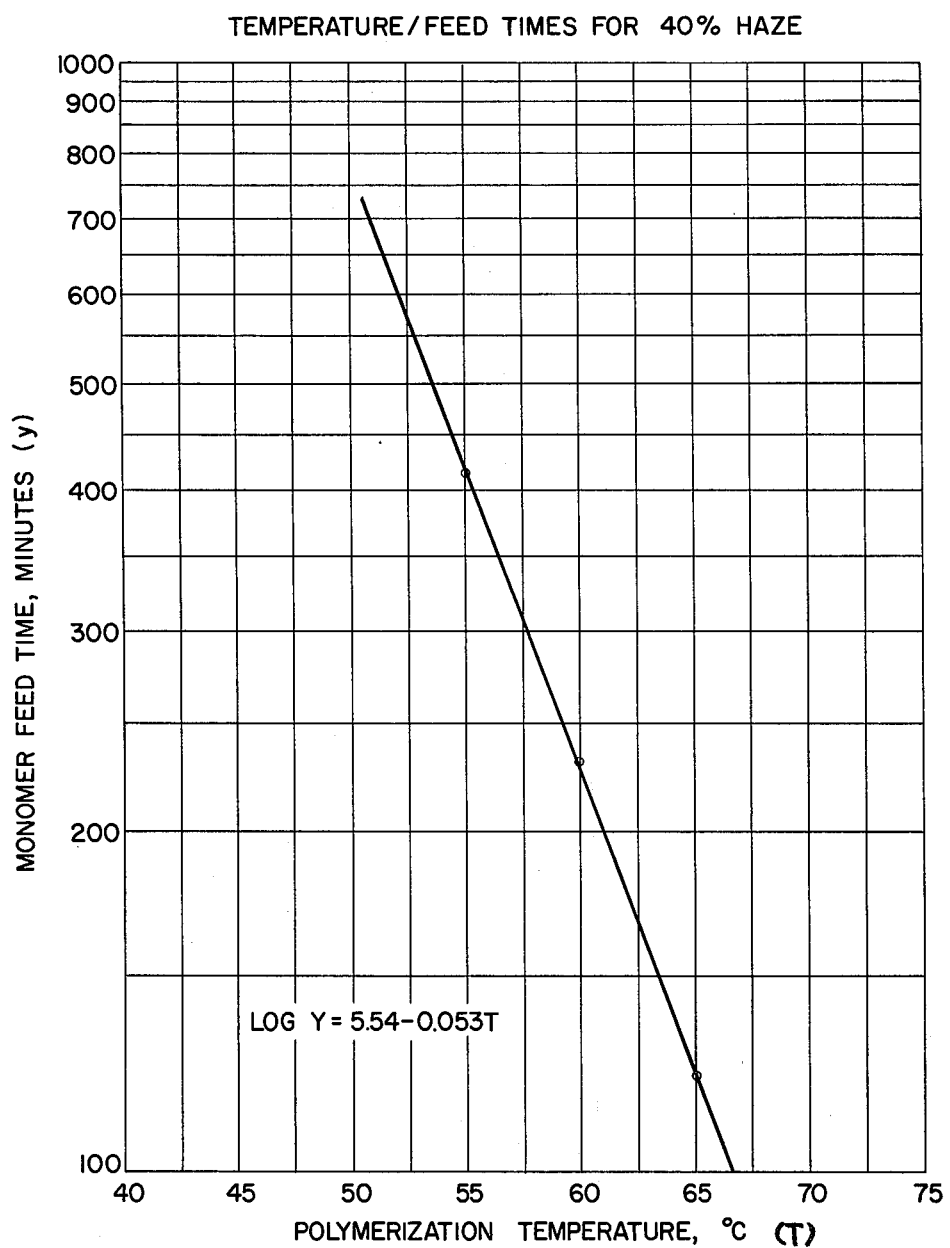

PROCESS FOR MANUFACTURE OF RUBBER-MODIFIED COPOLYMERS OF AN OLEFINIC NITRILE AND A VINYL AROMATIC MONOMER

The present invention relates to a novel process for preparing polymeric compositions which have low permeability to gases and more particularly pertains to a process for preparing rubber-modified copolymers of an olefinically unsaturated nitrile monomer and a vinyl aromatic monomer which includes the continuous co-addition during the polymerization reaction of the olefinic nitrile and vinyl aromatic monomer to the preformed rubber component under polymerizing conditions.

The process of the present invention produces polymeric products by the polymerization of a major portion of an olefinically unsaturated nitrile, such as acrylonitrile, and a minor portion of a vinyl aromatic monomer, such as styrene, in the presence of a preformed rubbery polymer of a conjugated diene, such as butadiene-1,3, and at least one member selected from the group consisting of a vinyl aromatic monomer, such as styrene, and an olefinic nitrile, such as acrylonitrile.

The resin compositions of this invention, as for example those comprising acrylonitrile and styrene, offer advantages of low raw materials cost and improved thermomechanical properties, as e.g. high heat distortion temperature. However, difficulties arise in producing copolymers of acrylonitrile and styrene having properties of strength, transparency, impact resistance and gas barrier properties, due to the unfavorable reactivity ratios of the two monomers.

It is well known that a batch polymerized co-polymer of acrylonitrile and styrene will result in a mixture of polymers whose composition varies widely, the polymer formed during the early part of the reaction consisting of styrenerich polymer, thus depleting the supply of this monomer and causing all polymer formed later in the reaction to approach the composition of polyacrylonitrile. Bars molded from these batch polymerized acrylonitrile/styrene polymers usually have poor physical properties and are translucent to opaque because of incompatibility of the very high nitrile portion of the polymer.

It is therefor an object of this invention to provide a useful resin of the composition hereinabove defined by maintaining a random distribution of the styrene units along the copolymer chain. This can be accomplished by sustaining a vanishingly low level of unreacted monomer during the polymerization reaction which can be achieved by co-adding the monomers to the preformed rubber at a rate slightly lower than the rate at which the monomers are consumed in the polymerization. This rate of monomer addition is defined by the following mathematical formula relating temperature of polymerization to the maximum rate of monomer addition for the particular polymerization temperature, in order to obtain resins with acceptable clarity.

In the formula:

$$\log y = 5.54 - 0.053T$$

"$T$" represents the temperature of polymerization °C., and "$y$" represents the maximum rate or the minimum time in minutes for monomer addition to the preformed rubber in order to obtain a resin having a maximum haze level of about 40%. Monomer addition at a rate slower than as defined by the above formula will result in a resin with a greater degree of clarity than the 40% haze level.

The products produced by the process of this invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent clarity and solvent resistance, and their high impact strength and excellent gas and vapor barrier properties make them especially useful in the packaging industry, as for example, in the manufacture of bottles, film and other types of containers for liquids and solids. With such excellent combination of properties, the copolymers of this invention can be used for many other purposes for which the known thermoplastic resins and thermosetting resins by themselves are entirely unsuited.

The conjugated diene monomers useful in the present invention include butadiene-1,3, isoprene, chloroprene, bromoprene, cyanoprene, 2,3-dimethyl-butadiene-1,3,2-ethyl-butadiene-1,3, 2,3-diethyl-butadiene-1,3, and the like, and others. Most preferred for the purpose of this invention are butadiene and isoprene because of their ready availability and their excellent copolymerization properties.

The olefinically unsaturated nitriles useful in the present invention are the alpha, beta-olefinically unsaturated mononitriles having the structure

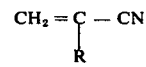

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The vinyl aromatic monomers useful in the present invention include styrene, alpha-methyl styrene, the vinyl toluenes, the vinyl xylenes, nuclear halogenated styrenes such as the chloro- and bromo-styrenes, and the like. Most preferred vinyl aromatic monomers are styrene and alpha-methyl styrene.

The process of the present invention is particularly applicable to the production of polymeric compositions resulting from the polymerization of 100 parts by weight of (A) at least 50% by weight of at least one nitrile having the structure

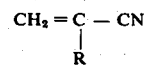

wherein R has the foregoing designation and (B) up to 50% by weight based on the combined weight of (A) and (B) of a vinyl aromatic monomer selected from the group consisting of styrene and alpha-methyl styrene, in the presence of from 1 to 40 parts by weight of (C) a rubbery polymer of (1) a conjugated diene monomer selected from the group consisting of butadiene and isoprene, (2) a vinyl aromatic monomer selected from the group consisting of styrene and alpha-methyl styrene, and (3) an olefinic nitrile having the structure

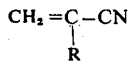

wherein R has the foregoing designation and wherein the rubbery polymer contains from 50 to 95% by weight of polymerized conjugated diene, the remainder being polymerized vinyl aromatic and or polymerized olefinic nitrile.

The process of the present invention is preferably carried out to produce resins resulting from the polymerization of 100 parts by weight of (A) at least 70% by weight of at least one nitrile monomer having the structure

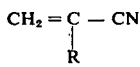

wherein R has the foregoing designation and (B) up to 30% by weight based on the combined weights of (A) and (B) of a vinyl aromatic monomer selected from the group consisting of styrene and alpha-methyl styrene, in the presence of from 5 to 20 parts by weight of (C) a rubber polymer of (1) a conjugated diene monomer selected from the group consisting of butadiene and isoprene, (2) a vinyl aromatic monomer selected from the group consisting of styrene and alpha-methyl styrene, and (3) an olefinic nitrile having the structure

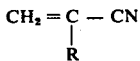

wherein R has the foregoing designation and wherein the rubbery polymer contains from 60 to 80% by weight of polymerized conjugated diene and the remainder being polymerized vinyl aromatic and or polymerized olefinic nitrile.

The polymeric compositions embodied in the present invention are prepared in accordance with the process of this invention preferably in an aqueous medium, wherein the monomers are copolymerized in the presence of an emulsion or suspension of the preformed rubber. It is important that the olefinic nitrile monomer and vinyl aromatic monomer be added continuously to the preformed rubber during the course of the polymerization in order to produce the desired transparent, impact resistant, gas-barrier resins.

The process of the present invention can be more specifically illustrated in the case of the copolymerization of acrylonitrile and styrene in the presence of a preformed rubbery polymer of butadiene-1,3, styrene and acrylonitrile. The polymerization reaction is carried out preferably in the substantially absence of molecular oxygen, in the presence of a polymerization initiator, and an emulsifier, at a temperature in the range of from about 40° to 75°C.

The preformed rubbery polymer, preferably in latex form, is placed in the polymerization reactor, a small amount of polymerization initiator is added, the polymerization conditions are set and the acrylonitrile and styrene are then added to the polymerization reactor in a continuous fashion over a period of a few hours. If desired, there can also be added to the polymerization reactor additional water which may contain additional fresh polymerization initiator. It is preferred that the polymer solids be maintained at about 20 to 33% by weight in the polymerization reaction medium by the controlled addition of monomers and water thereto during the course of the polymerization reaction.

In a more preferred procedure, contact between the rubber and the unreacted monomers can be increased by placing the entire charge of rubber latex into the reactor initially without dilution and using a minimum amount of micelle-forming emulsifier to maintain latex stability during the subsequent monomer addition. Thus the addition of water is withheld during the initial period for adding the monomers, forcing some of the monomer solution to polymerize on and/or within the rubber micelle. Small amounts of aqueous emulsifier can then be subsequently introduced during the later stages of the polymerization reaction.

The invention described herein can be more readily understood from the following illustrative examples, however, it is not to be construed that the scope of this invention is to be limited to these examples. The amounts of the ingredients utilized in these examples is expressed in parts by weight unless otherwise specified.

EXAMPLE 1

A. Preparation of the preformed elastomer

| | Parts by weight |
|---|---|
| Water | 175 |
| Tridecyloxy (polyethyleneoxy) phosphate (Emulsifier) | 1 |
| N-hydroxyethylethylenediaminetriacetic acid, tripotassium salt (Chelating agent) | 0.1 |
| Butadiene | 75 |
| Styrene | 20 |
| Acrylonitrile | 5 |
| Azo-bis-isobutyronitrile (Initiator) | 0.25 |
| t-Dodecylmercaptan (Chain transfer agent) | 0.5 |

The emulsifier and chelating agent were dissolved in the water and the pH was adjusted to 6.4 with potassium hydroxide. The initiator and modifier (chain transfer agent) were dissolved in acrylonitrile, and styrene and was then added to the acrylonitrile mixture. The water solution was charged to the reactor followed by the addition of the monomer solution. The reactor was sealed, cooled to 3°–5°C and was then evacuated. The butadiene was charged under pressure and the reaction was carried out at 60°C for 16 hours, or 90% conversion.

B. Into a 10-gallon reactor fitted with two marine propellers was added an initial charge comprising the following constituents expressed in parts by weight.

| Initial charge | Parts by weight |
|---|---|
| 75 Butadiene/20 styrene/5 acrylonitrile elastomer (as prepared in part A), rubber solids | 15 |
| ¹Hampol K₃-120 (Chelating agent) | 0.05 |
| ²Emulphogene BC-420 (Emulsifier) | 0.8 |
| ³GAFAC RS-710 (Emulsifier) | 0.48 |
| Limonene dimercaptan (Chain transfer agent) | 0.2 |
| ⁴Lupersol-11 (Initiator) | 0.3 |
| Water (to bring total solids to 22%) | 27.8 |

¹N-hydroxyethylethylenediamine triacetic acid, tripotassium salt
²Tridecyloxypolyethyleneoxyethanol
³Tridecyloxy (polyethyleneoxy) phosphate
⁴t-Butylperoxypivalate The Hampol K₃-120, Emulphogene BC-420, and GAFAC RS-710 were dissolved in water and the pH of the solution brought to about 4 with potassium hydroxide. This solution was then added with stirring to the elastomer latex. The pH of the resulting latex was then adjusted to 6.0 with potassium hydroxide.

The reactor was sealed and heat was applied. Oxygen-free nitrogen was bubbled slowly through the initial charge with stirring to remove dissolved oxygen. When the initial charge had equilibrated at 65°C (about 30 min.) Lupersol-11 was added by means of a syringe through the sample line which was then flushed with about 50 cc. of distilled water. After a period of 20 minutes the limonene dimercaptan was added.

Immediately following, Feed 1, having the following composition, was added to the initial charge at a rate of 0.3 parts per minute. The initial addition of Feed 1 was taken as the beginning of the reaction.

| Feed 1 | Parts by weight |
|---|---|
| Acrylonitrile | 75 |
| Styrene | 25 |
| Limonene dimercaptan | 1.8 |

In preparing the monomer feed, white Drierite was added to an excess of styrene and allowed to stand for at least two hours prior to making up Feed 1. The monomer feed was mixed just prior to use. After a period of 1 hour of adding the monomer feed (Feed 1), the addition of Feed 2 was begun at a rate of 0.72 parts per minute. Feed 2 had the following composition:

| Feed 2 | Parts by weight |
|---|---|
| Water | 190 |
| Potassium persulfate | 0.1 |
| GAFAC RS-710 | 1.3 |

After 330 minutes, both feeds were depleted and the reaction was terminated. About 2 ml. of an anti-foaming agent (Dow FG-10) and about 10 ml. of water were added to the reactor by means of a syringe through the sample line, and a vacuum was applied to the reactor to strip the unreacted monomer. Ambient pressure was re-established, the reactor and contents were cooled to room temperature, and the resin solids were recovered in the usual manner.

Test bars molded from the resin prepared by this procedure exhibited the properties shown in Table I. Also indicated in Table I are physical properties for test bars made from resins prepared as above, with the exception that times for monomer addition were varied over the periods of 145, 170 and 240 minutes. The oxygen, carbon dioxide and water vapor transmission rates were measured for this sample and were found to be as follows: $O_2$ transmission-3 cc/mil/ 100 in.$^2$/day/atm; $CO_2$ transmission - 9 cc/mil/ 100 in.$^2$/day/atm; and $H_2O$ vapor - 5.0 gms/mil/100 in.$^2$/day at 90% relative humidity at 100°F.

EXAMPLE 2

The procedure of Example 1 was repeated with the exception that the monomer feed (Feed 1) and the water feed (Feed 2) were added to the initial charge at 60°C, and the feed times were varied between 300 and 420 minutes. The addition of Feed 2 was begun approximately 60 minutes after the addition of Feed 1 was initiated.

The physical properties for molded bars obtained from these resins are also indicated in Table I.

EXAMPLE 3

The procedure of Example 1 was repeated with the exception that the monomer feed (Feed 1) and the water feed (Feed 2) were fed to the initial charge at 55°C, and the feed times were varied between 435 and 560 minutes. Again the addition of Feed 2 was begun about 60 minutes after the addition of Feed 1 was initiated.

The accompanying FIGURE shows the relationship between the polymerization temperature and the rate of monomer addition (in minutes) to the preformed rubber that will result in a resin with a haze level of 40%, as measured by the ASTM D 1003 test procedure. The data for the correlation shown in the accompanying FIGURE were derived from the data for Examples 1 to 3 in Table I by extrapolating the rates of monomer addition at a specific temperature to the 40% haze level. The 40% haze level was assumed to be the maximum amount of opacity that could be tolerated in an acceptable resin, and similar calculations and extrapolations would yield time/temperature relationships for any desirable haze level above about 10%. The aforementioned mathematical formula relating rate of monomer addition to the temperature of polymerization was then calculated from the graph shown in the Figure.

EXAMPLE 4

A clean 3-liter stainless steel reactor was charged with 256.4 grams of a latex containing 35.1% of a rubber having the weight ratio 65 butadiene/20 acrylonitrile/ 15 styrene. The rubber was prepared by the same procedure as in Example 1 (A). The pH of this latex was adjusted to 6.2 by the addition of 1.8 grams of a tridecyloxy-polyethyleneoxyphosphoric acid. To the resulting latex was added 4.8 grams of a tridecyloxy-polyethyleneoxyethanol and 1.2 grams of a 50% solution of tetrapotassium ethylenediamine tetraacetate. The reactor was closed, purged with nitrogen and brought to a temperature of 65°C.

At 65°C, 2.4 grams of a 75% solution of t-butyl peroxypivalate in mineral spirits was added and Feed 1 comprising 450 grams of acrylonitrile, 150 grams of styrene and 12 grams of limonene dimercaptan was initiated at a rate of 1.79 grams per minute. After 65 minutes Feed 2 comprising 1222 grams of $H_2O$, 15 grams of a 4% aqueous solution of $K_2S_2O_8$, 6 grams of a tridecyloxy-polyethyleneoxyphosphoric acid (solution pH brought to 6.6 with KOH) was begun at a rate of 4.9 grams per minute.

The reaction was terminated by cooling to room temperature after 360 minutes, and the resin solids recovered in the usual manner. Conversion was about 84% (average rate-13% /hour).

Bars molded from the resulting dry resin were transparent and exhibited the following properties: HDT 89°C; Notched Izod impact - 1.2 ft. lbs/in. notch; flexural strength - 13,600 psi; flexural modulus-370,000 psi; Brabender Plasticorder torque - 2750 meter-grams (No. 6 roller head, 35 RPM, 230°C, 50 gram charge polymer). The haze value for the molded bar was 38% and the resin had excellent $O_2$, $CO_2$ and $H_2O$ vapor barrier properties.

EXAMPLE 5

The polymer was prepared by reacting 65 parts of acrylonitrile and 35 parts of styrene by weight in the presence of 15 parts per hundred parts of monomer of a preformed polymer rubber having the charged composition of 75 butadiene/20 styrene/5 acrylonitrile by weight, by the process of Example 1. The product obtained had the following physical properties: HDT-99°C; flexural strength -13,000 psi; flexural modulus - 340,000 psi; Notched Izod impact 5.8 ft. lbs/in. notch, and a % haze of 28. The resin had excellent $O_2$, $CO_2$ and $H_2O$ vapor barrier properties.

EXAMPLE 6

The polymer was prepared by the process of Example 1 by reacting 80 parts of acrylonitrile and 20 parts of styrene by weight in the presence of 7.4 parts per hundred parts of monomer of a preformed rubber obtained by reacting 70 parts of butadiene and 30 parts of acrylonitrile, by weight.

The resulting product had the following properties: HDT-90°C; flexural strength - 14,900 psi; flexural modulus 360,000 psi; Notched Izod - 1.0 ft. lbs/in. notch; $O_2$ transmission - 1.2 cc/mil/100 in.$^2$/day/atm; and an acceptably low haze value.

EXAMPLE 7

The process of Example 1 was repeated employing acrylonitrile and styrene monomers in the amounts of 75 and 25 parts by weight, respectively, and a preformed rubber in the amount of 12 parts per hundred parts of monomer having the composition 65 parts butadiene and 35 parts of acrylonitrile, by weight. The resultant polymer had the following physical properties: HDT-85°C; flexural strength - 12,100 psi; flexural modulus - 310,000 psi; Notched Izod - 0.8 ft. lbs./in. notch; a % haze of 28 and excellent $O_2$, $CO_2$ and $H_2O$ vapor barrier properties.

EXAMPLE 8

The process of Example 1 was repeated utilizing 75 parts of acrylonitrile and 25 parts of styrene, by weight, and 20 parts per hundred parts of monomer of a preformed rubber prepared from 80 parts of butadiene and 20 parts of acrylonitrile. The resulting product was characterized as follows: HDT - 92°C; flexural strength - 11,800 psi; flexural modulus - 380,000 psi; Notched Izod - 3.6 ft. lbs./in. notch; a % haze of 8.2; and excellent $O_2$, $CO_2$ and $H_2O$ vapor barrier properties.

EXAMPLE 9

The polymer was prepared as in Example 1 with the exception that the rubber composition consisted of 75 parts of butadiene and 25 parts of styrene by weight. The molded bar obtained from the resulting polymer had a % haze of 14.3.

EXAMPLE 10

The process of Example 1 was repeated except that the monomer feed and the water feed were begun at the same time, without the usual 30 to 60 minute delay. The molded bar obtained from the resin was opaque and had a Notched Izod of 0.17 ft. lbs./in. notch. A comparison of the above example with the previous examples in which the initiation of the water feed is delayed for a period of time after the monomer feed is begun, shows the advantage associated with the delayed addition of the water feed on the Notched Izod measurement of the resulting polymer.

EXAMPLE 11

| Charge | Parts by weight |
|---|---|
| 75 Butadiene/20 styrene/5 acrylonitrile elastomer, 32% (as in 1 A) | 75 (23.4) |
| Emulphogene BC-420 | 0.4 |
| GAFAC RS-710 | 0.5 |
| Citric Acid | 0.1 |
| Water | 125 |
| Potassium persulfate | 0.1 |
| Acrylonitrile | 37.5 |
| Styrene | 12.5 |
| Pentaerythritol tetrakis - 3 mercaptopropionate | 0.85 |

The contents were charged to a bottle, and the bottle and contents were purged with oxygen-free nitrogen, sealed and placed in a polymerization bath at 65°C for 12 hours. The initial pH was 2.88. The resin was recovered and dried in the usual manner. A compression molded disc prepared from the resin was opaque.

It is obvious from the aforementioned formula that it would be impossible to obtain a resin with a haze value of less than 40% for a polymerization reaction containing all of the reactants initially, as in the above example, for under these conditions the rate of monomer addition would approach zero and according to the formula T would become impractically high.

Table I

| | | | Example I | | | |
|---|---|---|---|---|---|---|
| Polymerization Temp. °C | Polymerization Time (min.) | % Haze | HDT, °C | Flexural Strength, psi | Flexural Modulus, psi | Notched Izod, Ft. lb/in. notch |
| 65 | 145 | 32.1 | 89 | 12,900 | 380,000 | 0.2 |
| 65 | 170 | 25.7 | 95 | 13,200 | 330,000 | 1.5 |
| 65 | 240 | 13.2 | 89 | 12,600 | 330,000 | 1.2 |
| 65 | 330 | 10 | 90 | 13,000 | 360,000 | 2.0 |
| | | | Example II | | | |
| 60 | 300 | 27.1 | 87 | 12,800 | 342,000 | 0.9 |
| 60 | 360 | 19.3 | 98 | 13,600 | 350,000 | 1.4 |
| 60 | 420 | 13.9 | 97 | 13,200 | 360,000 | 3.3 |
| | | | Example III | | | |
| 55 | 434 | 38.0 | 99 | 8,040 | 359,000 | 0.2 |
| 55 | 496 | 34.0 | 98 | 11,900 | 340,000 | 0.6 |
| 55 | 560 | 29.1 | 88 | 12,800 | 367,000 | 0.4 |

We claim:
1. In the process for the manufacture of nitrile resins by reacting 100 parts by weight of:
A. at least 50% by weight of at least one nitrile having the structure

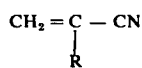

wherein R is hydrogen, a lower alkyl group having from 1 to 4 carbon atoms or a halogen, and
B. up to 50% by weight based on the combined weight of (A) and (B) of a vinyl aromatic selected from the group consisting of styrene and alpha-methyl styrene, in the presence of from about 1 to 40 parts by weight of (C) a preformed rubbery polymer of a conjugated diene monomer selected from the group consisting of butadiene and isoprene, and at least one member selected from the group consisting of a vinyl aromatic as defined in (B) and a nitrile as defined in (A), wherein said rubbery polymer contains from 50 to 95% by weight of polymerized conjugated diene, and the remainder being polymerized vinyl aromatic and/or polymerized olefinic nitrile, wherein said reaction is conducted in an aqueous medium comprising water, an emulsifier and a free-radical polymerization initiator, in the substantial absence of molecular oxygen, the improvement comprising:

adding substantially all of the monomers (A) and (B) simultaneously to the preformed rubbery polymer (C) at a rate no greater than that designated by the formula:

$$\log y = 5.54 - 0.053\ T$$

wherein $T$ represents the polymerizing temperature in °C and $y$ represents the minimum time in minutes for co-adding monomers (A) and (B) to (C), within the temperature range of from 40° to 75°C to obtain a polymer having acceptable optical clarity.

2. The process in claim 1 wherein the addition of a major portion of the aqueous medium comprising water, emulsifier and a free radical polymerization initiator, is started from 30 to 75 minutes after the monomer feed is initiated.

3. The process in claim 1 wherein the (A) component is acrylonitrile.

4. The process in claim 3 wherein the (B) component is styrene.

5. The process in claim 4 wherein there is employed a mixture of 75% by weight of (A) and 25% by weight of (B).

6. The process in claim 4 wherein there is employed a mixture of at least 70% by weight of component (A) and up to 30% by weight of component (B).

* * * * *